United States Patent
Gyenes et al.

(10) Patent No.: US 6,574,111 B1
(45) Date of Patent: Jun. 3, 2003

(54) IMPACT RESISTANT RECHARGEABLE BATTERY CELL WITH CRUMPLE ZONE

(75) Inventors: Russell Ernest Gyenes, Lawrenceville, GA (US); Corina Stanescu, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/155,940

(22) Filed: May 26, 2002

(51) Int. Cl.[7] .................................................. H05K 1/14
(52) U.S. Cl. ...................................................... 361/742
(58) Field of Search ................................ 361/742, 804, 361/824, 600, 601, 502, 508, 516, 519; 429/1, 94, 100, 163, 164

(56) References Cited

U.S. PATENT DOCUMENTS

| | | | |
|---|---|---|---|
| 4,396,689 A | | 8/1983 | Grimes et al. |
| 5,283,137 A | | 2/1994 | Ching |
| 5,434,017 A | * | 7/1995 | Berkowitz et al. .......... 429/130 |
| 5,786,980 A | * | 7/1998 | Evans ..................... 174/17 GF |
| 6,205,034 B1 | * | 3/2001 | Zayatz ....................... 361/824 |
| 6,317,335 B1 | * | 11/2001 | Zayatz ....................... 361/600 |

* cited by examiner

Primary Examiner—David Martin
Assistant Examiner—Thanh S. Phan
(74) Attorney, Agent, or Firm—Philip H. Burrus, IV

(57) ABSTRACT

This invention includes a spacer, preferably having a cross section resembling the letter "T", that is positioned between the electrode assembly and the metal can in electrochemical battery cells. The spacer allows a void to exist between the corner of the metal can and the electrode assembly. This "crumple zone" prevents any external damage to the can from damaging the internal electrode assembly. The invention facilitates passage of common OEM drop testing without compromising cell performance. The invention increases the reliability of the cell by allowing the cell to resist external impacts.

7 Claims, 3 Drawing Sheets

CORNER OF
CELL-TYPICAL ASSEMBLY

CORNER OF
CELL WITH SPACER

IMPACT RESISTANT RECHARGEABLE BATTERY CELL WITH CRUMPLE ZONE

BACKGROUND

1. Technical Field

This invention relates generally to rechargeable electrochemical battery cells, and more particularly to impact resistant packaging for such cells.

2. Background Art

Portable, battery-operated, electronic devices seem to be everywhere. From handheld games, to compact disc players, to radios, to personal data assistants (PDAs), to phones, to pagers, it is becoming rare to encounter a person who does not carry at least one portable electronic device with them all the time. People carry the devices for entertainment, for organizational purposes, and for staying connected with others. A common characteristic shared by each of these devices is that they all rely on batteries for portability.

Batteries are manufactured by taking two electrically opposite electrodes and stacking them together, with each electrode being physically separate from the other. A common way to manufacture the electrochemical cells used in the batteries is known as the "jellyroll" technique, where the inner parts of the cell are rolled up and placed inside an aluminum can, thereby resembling an old-fashioned jellyroll cake. Aluminum is the preferred metal for the can due to its light weight and favorable thermal properties. To understand the jellyroll technique, consider the following example:

Cells are made of a positive electrode (cathode), a negative electrode (anode), and a separator that prevents these two from touching, while allowing electrons to pass through. Referring now to FIG. 1, illustrated therein is a cross-sectional side view of a typical electrode layer assembly. The electrode 10 includes a separator 12 having a top and bottom 14 and 16. Disposed on the top 14 of the separator 12 is a first layer 18 of an electrochemically active material. For example, in a nickel metal hydride battery, layer 18 may be a layer of a metal hydride charge storage material as is known in the art. Alternatively, layer 18 may be a lithium or a lithium intercalation material as is commonly employed in lithium batteries.

Disposed atop layer 18, is a current collecting layer 20. The current collecting layer may be fabricated of any of a number of metals known in the art. Examples of such metals include, for example, nickel, copper, stainless steel, silver, and titanium. Disposed atop the current collection layer 20 is a second layer 22 of electrochemically active material.

Referring now to FIGS. 2 and 3, illustrated therein is stack of electrodes like that in FIG. 1 assembled in the jellyroll configuration so as to make a rechargeable cell. In FIGS. 2 and 3, two electrodes 40 and 60 are provided as described above. Electrode 40 is fabricated with two layers of, for example, negative/active electrochemical material while electrode 60 is fabricated with two layers of positive electrode material. Each electrode 40,60 is provided with a current collecting region 20. The current collecting region 20 is disposed on the current collector, and allows for electrical communication between the electrode itself and a terminal on the outside of the cell can into which the electrode stack of FIG. 2 may be inserted. While the current collecting region 20 is disposed on the top and bottom of the jellyroll in this exemplary embodiment, note that they may equally be located at the leading and trailing edges of the jellyroll as well.

The electrodes 40 and 60 are arranged in stacked relationship with the current collecting regions 20 disposed on opposite edges of the stack. Thereafter, the stack is rolled into a roll 70 for a subsequent insertion into an electrochemical cell can. The cans are generally oval, rectangular or circular in cross section with a single opening and a lid. This is similar to the common trashcan.

Referring now to FIG. 3, illustrated therein is a cross-sectional cut-away view of the stacked configuration shown in FIG. 2. Here, electrodes 40 and 60 can be seen in stacked orientation. Electrode 40 comprises substrate 42 first layer of negative active material 44, current collecting layer 46, and second layer of active material 48. Disposed immediately atop layer 48 is the separator 62 of electrode 60. Thereafter the first layer of active material 64 is disposed atop the separator 62 with current collecting layer 66 disposed there over and second layer of active material 68 disposed atop the current collecting layer.

As the configuration is rolled into roll 70, the outer membrane layer is rolled into contact with the membrane substrate layer 42 of electrode 40 is rolled into contact with the second layer of active material 68 of electrode 60. In this way, the membrane substrate layers act as a separator to electrically isolate the positive and negative electrodes from one another. Moreover, as the membranes are porous, they may be filled with a liquid electrolyte such as is known in the art. Accordingly, the membrane allows for deposition of ultra-thin electrode layers, and current collecting layers, while providing the function of both electrolyte reservoir and separator. The result is ultra-thin electrodes having extremely high capacity.

Once the jellyroll is complete, it is inserted into a metal can 122 as shown in FIG. 4. The metal can 122 includes a first metal connector 24 that may serve as the cathode and a second metal connector 26 capable of serving as the anode. Looking to the jellyroll, the various layers can be seen: separator 34, first electrode 34, and second electrode 36. Depending upon the construction, an electron or current collector or grid 38 may be added to the device if desired. The current collector 38 is typically formed from a metal such as cobalt, copper, gold, iron, manganese, nickel, platinum, silver, tantalum, titanium, or zinc.

Traditionally, such metal-can type batteries were inserted into plastic battery housings that included circuitry like protection circuits, charging circuits, fuel gauging circuits and the like. The plastic battery housings were then used with electronic host devices. However, as electronic devices have gotten smaller and smaller, manufacturers have begun putting the associated battery circuitry in the host device. Thus, they use just the metal-can battery, without protective plastic housing, in their devices.

This creates a problem in that, as stated above, the metal cans are generally made from soft metals like aluminum. Thus, when the metal-can battery is dropped, the can may dent, bend and deform. Recall from above that it is important in battery construction that the cathode and anode be kept apart by the separator or membrane layer. If the metal can bends or dents, this may cause the cathode and anode to touch inside the can, thereby creating a short circuit condition in the can. Short circuit conditions can lead to high currents that generate high temperatures and seriously compromise reliability of the battery.

There is thus a need for an improved metal-can battery assembly that prevents short circuit conditions caused by impact related deformations in the metal can.

DETAILED DESCRIPTION OF THE INVENTION

Figure 1:
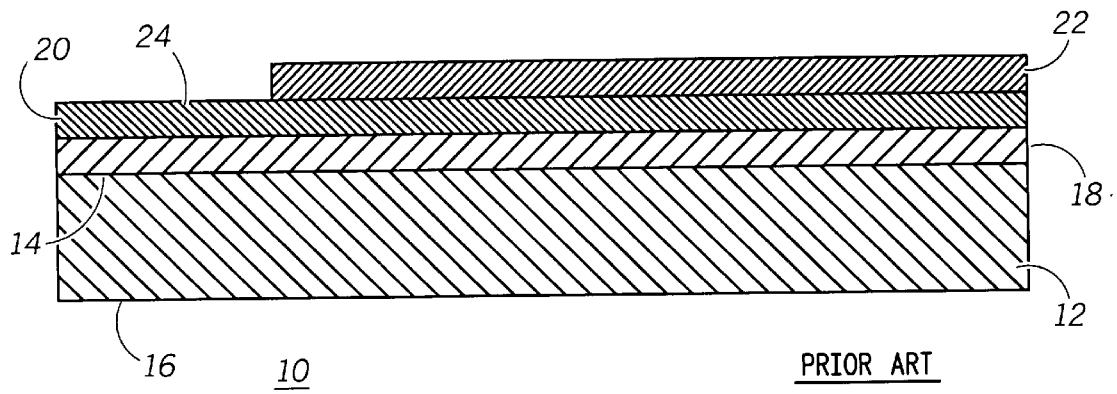
FIG. 1 is a cross-sectional side view of a typical prior art electrode layer assembly.
Figure 2:
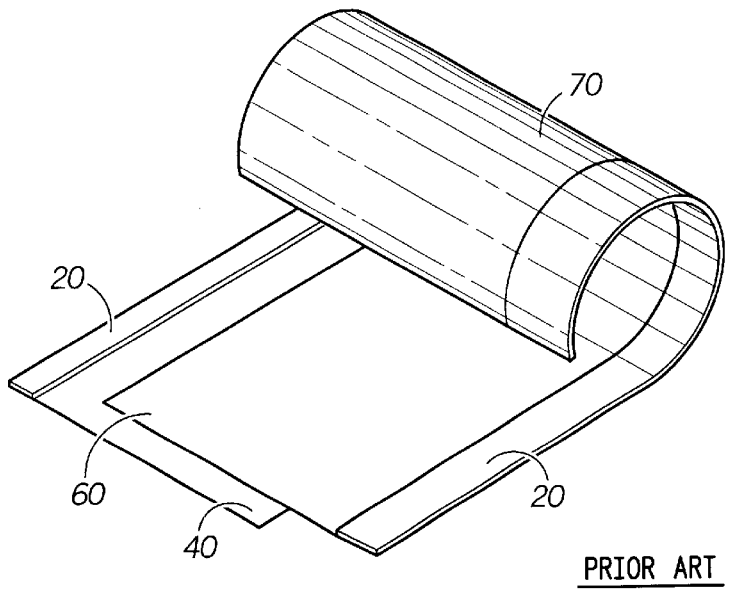
FIGS. 2 is a prior art stack of electrodes assembled in the jellyroll configuration so as to make a rechargeable cell.
Figure 3:
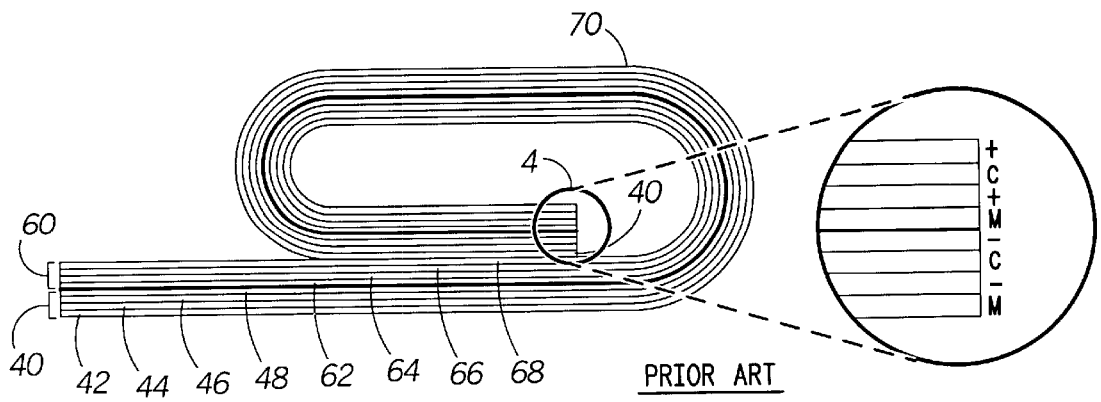
FIG. 3 is a cross-sectional cut-away view of the stacked configuration shown in FIG. 2.
Figure 4:
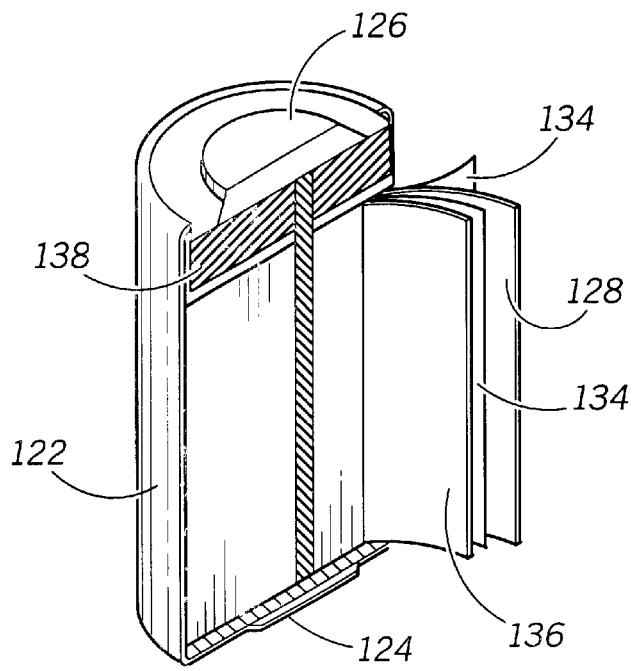
FIG. 4 is cut away, cross sectional view of a prior art jellyroll inserted into a metal can.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 5:
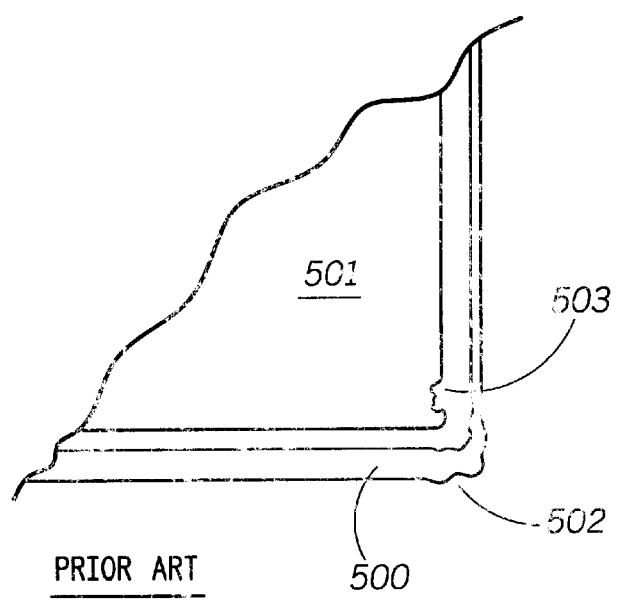
FIG. 5 is a cross sectional view of a prior art metal-can battery that has been repeatedly dropped on a hard surface as is typical in OEM quality and qualification practice.

Referring now to FIG. 5, illustrated therein is a cross sectional view of a prior art metal-can battery that has been repeatedly dropped on a hard surface as is typical in OEM quality and qualification practice. For example, a typical qualification test may require the battery withstand 30 five-foot drops to a concrete surface. Testing was done on common lithium-ion metal-can cells in the lab. Test results showed that on average 7 batteries in 500 failed this test, with an average of 4 failing within the first 18 drops. Nothing would be more frustrating for a consumer than to pay $200 for a new personal organizer only to drop it a couple of times and have it stop working! As shown in FIG. 5, the failure is caused by deformation 502 of the metal can 500 causing damage 503 to the inner jellyroll 501. As stated above, this damage 503 can cause short circuits within the cell.

Figure 6:
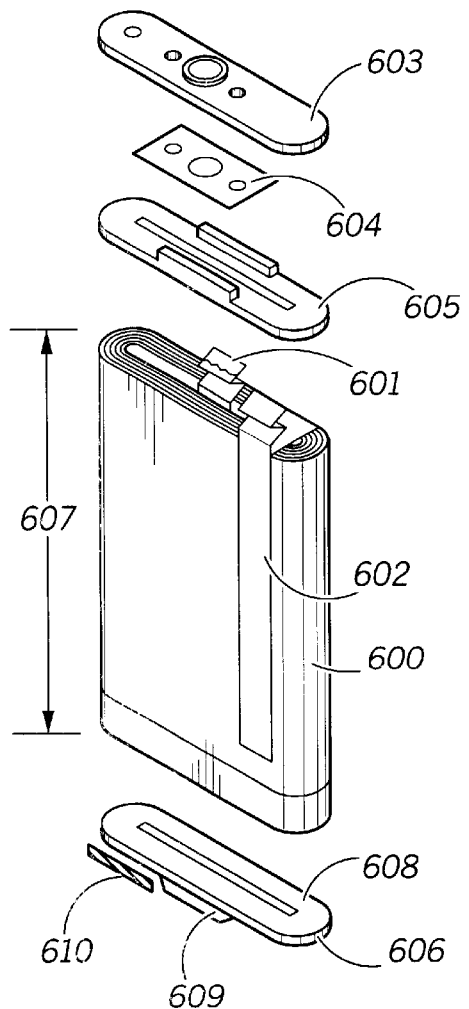
FIG. 6 is a cell assembly in accordance with the invention.

Referring now to FIG. 6, illustrated therein is a cell assembly in accordance with the invention. A jellyroll 600 with cathode 601 and anode 602 is provided. The jellyroll 600 will be inserted into a metal can (not shown). The assembly includes a first metal connector 603 that serves as the external cathode and a tab 604 for coupling the first metal connector 603 to the cathode 601. An insulator 605 is provided to isolate the first metal connector 603 from the anode 602. Flat, top insulators, at one end of the jellyroll 600, are known in the art as recited in U.S. Pat. No. 6,317,335 to Zayatz.

In accordance with the invention, the jellyroll 600, which would normally contact the bottom of the metal can, has been shortened. Test results have shown that a preferred shortening length is 2% of the length of the can. This shortened length is represented by dimension 607. Once the jellyroll 600 has been shortened, a spacer 606 is included at the base of the jellyroll 600. The spacer 606 must be designed so as to fully support the jellyroll 600 with a first surface, yet contact the can with only a fraction of that area by way of a second surface 609. This leaves a void between the corner of the can and the spacer 606. The void is shown as region 610.

Figure 7:
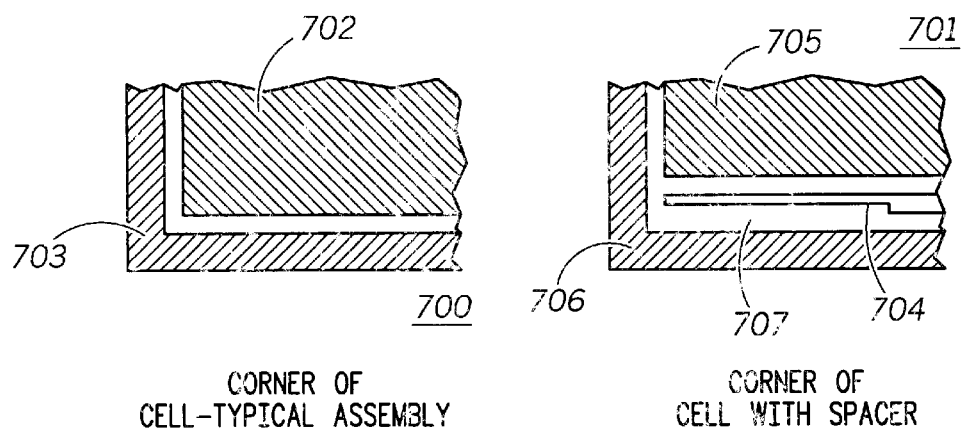
FIG. 7 is a comparison of cross-sectional views of the prior art cell and a cell in accordance with the invention.

Turning now to FIG. 7, illustrated therein is a comparison of cross-sectional views of the prior art cell 700 and a cell in accordance with the invention 701. In the prior art cell 700, the jellyroll 702 mounts flush against the metal can 703. However, in the cell in accordance with the invention 701, the spacer 704 leaves a void 707 between the jellyroll 705 and the metal can 706. This void allows the can 706 to deform, or "crumple", when dropped on a corner, while the jellyroll 705 remains unharmed. With the spacer 704 inserted, test results have shown that zero batteries in 250 failed as a result of the 30 drops to concrete.

The spacer is preferably manufactured by way of injection molding, using a suitable thermo-plastic like acrylonitrile butadiene styrene (ABS), polycarbonate and polycarbonate-ABS due to their durability. Other equivalents known in the art, like styrene, poly-styrene or other thermo-plastics, for example, may be substituted. Note that the cost of the cell shown in FIG. 6 may be reduced by designing the spacer so as to be used as both the crumple zone spacer and the insulator, as illustrated.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, in a preferred embodiment the spacer is constructed in the shape of the letter "T" to maximize void areas. However, other shapes, including "V" and the like may also be used.

What is claimed is:

1. A battery cell, the cell comprising:
   a. a housing;
   b. an electrode assembly, the electrode assembly comprising an anode and cathode, the electrode assembly having at least a first end and a second end, the first end comprising connections to the anode and cathode; and
   c. a spacer, the spacer having a first surface and a second surface, wherein the second surface has less surface area than the first;
      wherein the electrode assembly is at least 2% shorter in length than the housing, and wherein the spacer is disposed between the electrode assembly and the housing;
      wherein the spacer is disposed between the second end of the electrode assembly and the housing.

2. The cell of claim 1, wherein the insertion of the spacer provides at least one void between the spacer and a corner of the housing.

3. The cell of claim 2, wherein the spacer is manufactured from a material selected from the group consisting of ABS, polycarbonate, polycarbonate-ABS, styrene and poly-styrene.

4. The cell of claim 3, wherein the surface area of the second surface is less than 80% of the surface area of the first surface.

5. The cell of claim 4, wherein the cross section of the spacer is T-shaped.

6. The cell of claim 1, further comprising a second spacer, wherein the second spacer is disposed opposite the first relative to the electrode assembly, further wherein the second electrode prevents contact between the cathode and anode.

7. A method of manufacturing a rechargeable battery cell, the method comprising the steps of:
   a. first inserting a spacer into a housing, wherein the spacer comprises a first surface and a second surface, wherein the second surface has less surface area than the first, the spacer insertion resulting in the second surface contacting the bottom of the housing; and b. next inserting an electrode assembly into the housing, the electrode assembly having a length at least 2% less than the length of the can, the electrode assembly insertion resulting in the first surface contacting the electrode assembly.

* * * * *